(12) United States Patent
Haltiner, Jr. et al.

(10) Patent No.: US 6,967,064 B2
(45) Date of Patent: Nov. 22, 2005

(54) CO-FLOW ANODE/CATHODE SUPPLY HEAT EXCHANGER FOR A SOLID-OXIDE FUEL CELL ASSEMBLY

(75) Inventors: Karl J. Haltiner, Jr., Fairport, NY (US); Sean M. Kelly, Churchville, NY (US)

(73) Assignee: Delphi Technologies, Inc., Troy, MI (US)

( * ) Notice: Subject to any disclaimer, the term of this patent is extended or adjusted under 35 U.S.C. 154(b) by 228 days.

(21) Appl. No.: 10/178,860

(22) Filed: Jun. 24, 2002

(65) Prior Publication Data

US 2003/0235734 A1 Dec. 25, 2003

(51) Int. Cl.[7] .......................... H01M 8/04; H01M 8/06; H01M 8/10; B60K 1/04
(52) U.S. Cl. ............... 429/26; 429/17; 429/20; 429/24; 429/30; 429/38; 180/65.1
(58) Field of Search .................. 429/13, 17, 20, 429/26, 24, 38; 180/65.1

(56) References Cited

U.S. PATENT DOCUMENTS

| | | | | |
|---|---|---|---|---|
| 5,413,879 A | * | 5/1995 | Domeracki et al. ........... | 429/30 |
| 5,928,805 A | * | 7/1999 | Singh et al. .................. | 429/13 |
| 5,968,680 A | * | 10/1999 | Wolfe et al. .................. | 429/13 |
| 6,361,891 B1 | * | 3/2002 | Breault et al. ................ | 429/26 |
| 6,365,290 B1 | * | 4/2002 | Ghezel-Ayagh et al. ...... | 429/20 |
| 6,475,652 B2 | * | 11/2002 | Grasso et al. ................. | 429/13 |

* cited by examiner

Primary Examiner—Tracy Dove
(74) Attorney, Agent, or Firm—Paul L. Marshall

(57) ABSTRACT

In a solid-oxide fuel cell assembly, a co-flow heat exchanger is provided in the flow paths of the reformate gas and the cathode air ahead of the fuel cell stack, the reformate gas being on one side of the exchanger and the cathode air being on the other. The reformate gas is at a substantially higher temperature than is desired in the stack, and the cathode gas is substantially cooler than desired. In the co-flow heat exchanger, the temperatures of the reformate and cathode streams converge to nearly the same temperature at the outlet of the exchanger. Preferably, the heat exchanger is formed within an integrated component manifold (ICM) for a solid-oxide fuel cell assembly.

8 Claims, 6 Drawing Sheets

CO-FLOW ANODE/CATHODE SUPPLY HEAT EXCHANGER FOR A SOLID-OXIDE FUEL CELL ASSEMBLY

This invention was made with U.S. Government support through CONTRACT NO. DE-FC26202NT 4124 awarded by the Department of Energy, and, in accordance with the terms set forth in said contract, the U.S. Government may have certain rights in the invention.

TECHNICAL FIELD

The present invention relates to hydrogen/oxygen fuel cells having a solid-oxide electrolytic layer separating an anode layer from a cathode layer; more particularly, to fuel cell stack assemblies and systems wherein air is flowed to the cathodes and fuel is flowed to the anodes; and most particularly, to such fuel cell assemblies and systems wherein the cathode air is heated and the anode fuel cooled by their being passed through a mutual heat exchanger prior to entering the fuel cell stack.

BACKGROUND OF THE INVENTION

Fuel cells which generate electric current by the electrochemical combination of hydrogen and oxygen are well known. In one form of such a fuel cell, an anodic layer and a cathodic layer are separated by an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions transport through the electrolyte and combine at the anode/electrolyte interface with four hydrogen ions to form two molecules of water. The anode and the cathode are connected externally through a load to complete the circuit whereby four electrons are transferred from the anode to the cathode. When hydrogen is derived from "reformed" hydrocarbons, the "reformate" gas includes CO which is converted to $CO_2$ at the anode via an oxidation process similar to that performed on the hydrogen. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is usual to stack together, in electrical series, a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the it stack. The perimeter spacers include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel stack; providing air for cooling the fuel cell stack; providing combustion air to an afterburner for unspent fuel exiting the stack; and providing cooling air to the afterburner and the stack. A complete SOFC assembly also includes appropriate piping and valving, as well as a programmable electronic control unit (ECU) for managing the activities of the subsystems simultaneously.

In an SOFC being supplied with fuel from a reformer, the fuel cell supply gas is provided directly from the reformer. The reforming process takes place at an elevated temperature (800° C.–1000° C.) that is somewhat higher than the optimum stack operating temperature. For proper operation of the stack, it is preferable that the anode gas be at a temperature somewhat below the stack operating temperature, preferably between about 550° C. and 700° C. In addition, it is preferable that the inlet temperature of cathode air be about the temperature of the anode gas.

It is a principal object of the present invention to provide optimal tempering of anode gas and cathode air.

BRIEF DESCRIPTION OF THE INVENTION

Briefly described, in a solid-oxide fuel cell assembly, a co-flow heat exchanger is provided in the flow paths of the anode gas and the cathode air ahead of the fuel cell stack, the anode gas being on one side of the exchanger and the cathode air being on the other. At the entrance to the heat exchanger, the anode gas is at a substantially higher temperature than is desired in the stack, and the cathode gas is substantially cooler than desired. Since the heat exchanger is co-flow, the anode and cathode streams converge to nearly the same temperature at the outlet of the exchanger.

In a currently preferred embodiment, the heat exchanger is formed within an integrated component manifold (ICM) for a solid-oxide fuel cell assembly. Within the ICM is a tube, which may have external fins or other heat transfer structures, leading from the reformer outlet to the anode inlet. The tube is fully immersed in the cathode supply air passage, leading from the cathode pre-heat heat exchanger to the cathode air inlet, which arrangement provides the co-flow heat exchanger function in a very small volume at a very low manufacturing cost.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
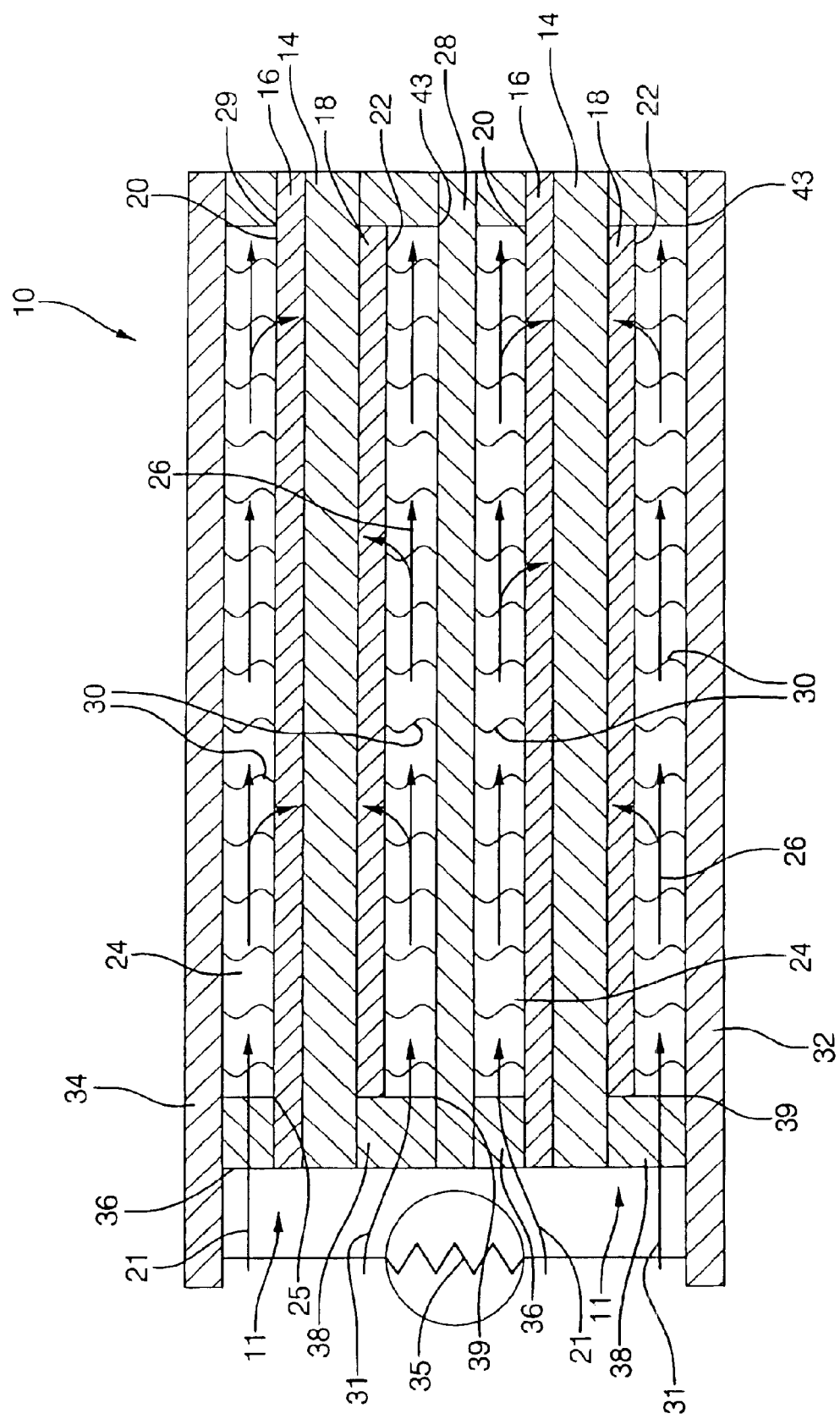
FIG. 1 is a schematic cross-sectional view of a two-cell stack of solid oxide fuel cells.

Referring to FIG. 1, a fuel cell stack 10 includes elements known in the art of solid oxide fuel cell stacks comprising more than one fuel cell. The example shown includes two identical fuel cells 11, connected in series, and is of a class of such fuel cells said to be "anode-supported" in that the anode is a structural element having the electrolyte and cathode deposited upon it. Element thicknesses as shown are not to scale.

Each fuel cell 11 includes an electrolyte element 14 separating an anodic element 16 and a cathodic element 18. Each anode and cathode is in direct chemical contact with its respective surface of the electrolyte, and each anode and cathode has a respective free surface 20, 22 forming one wall of a respective passageway 24, 26 for flow of gas across the surface. Anode 16 of a first fuel cell 11 faces and is electrically connected to an interconnect 28 by filaments 30 extending across but not blocking passageway 24. Similarly, cathode 18 of a second fuel cell 11 faces and is electrically connected to interconnect 28 by filaments 30 extending across but not blocking passageway 26. Similarly, cathode 18 of the fuel cell 11 faces and is electrically connected to a cathodic current collector 32 by filaments 30 extending across but not blocking passageway 26, and anode 16 of the second fuel cell 11 faces and is electrically connected to an anodic current collector 34 by filaments 30 extending across but not blocking passageway 24. Current collectors 32, 34 may be connected across a load 35 in order that the fuel cell stack 10 performs electrical work. Passageways 24 are formed by anode spacers 36 between the perimeter of anode 16 and either interconnect 28 or anodic current collector 34. Passageways 26 are formed by cathode spacers 38 between the perimeter of electrolyte 14 and either interconnect 28 or cathodic current collector 32. Anode spacer 36 and cathode spacer 38 are formed from sheet stock in such a way to yield the desired height of the anode passageways 24 and cathode passageways 26.

Preferably, the interconnect and the current collectors are formed of an alloy, typically a "superalloy," which is chemically and dimensionally stable at the elevated temperatures necessary for fuel cell operation, generally about 750° C. or higher, for example, Hastelloy, Haynes 230, or a stainless steel. The electrolyte is formed of a ceramic oxide and preferably includes zirconia stabilized with yttrium oxide (yttria), known in the art as YSZ. The cathode is formed of, for example, porous lanthanum strontium manganate or lanthanum strontium iron, and the anode is formed of, for example, a mixture of nickel and YSZ.

In operation (FIG. 1), reformate gas 21 is provided to passageways 24 at a first edge 25 of the anode free surface 20, flows parallel to the surface of the anode across the anode in a first direction, and is removed at a second and opposite edge 29 of anode surface 20. Hydrogen and CO diffuse into the anode to the interface with the electrolyte. Oxygen 31, typically in air, is provided to passageways 26 at a first edge 39 of the cathode free surface 22, flows parallel to the surface of the cathode in a second direction which can be orthogonal to the first direction of the reformate (second direction shown in the same direction as the first for clarity in FIG. 1), and is removed at a second and opposite edge 43 of cathode surface 22. Molecular oxygen gas ($O_2$) diffuses into the cathode and is catalytically reduced to two $O^{-2}$ ions by accepting four electrons from the cathode and the cathodic current collector 32 or the interconnect 28 via filaments 30. The electrolyte ionically conducts or transports $O^{-2}$ anions to the anode electrolyte innerface where they combine with four hydrogen atoms to form two water molecules, giving up four electrons to the anode and the anodic current collector 34 or the interconnect 28 via filaments 30. Thus cells A and B are connected in series electrically between the two current collectors, and the total voltage and wattage between the current collectors is the sum of the voltage and wattage of the individual cells in a fuel cell stack.

Figure 2:
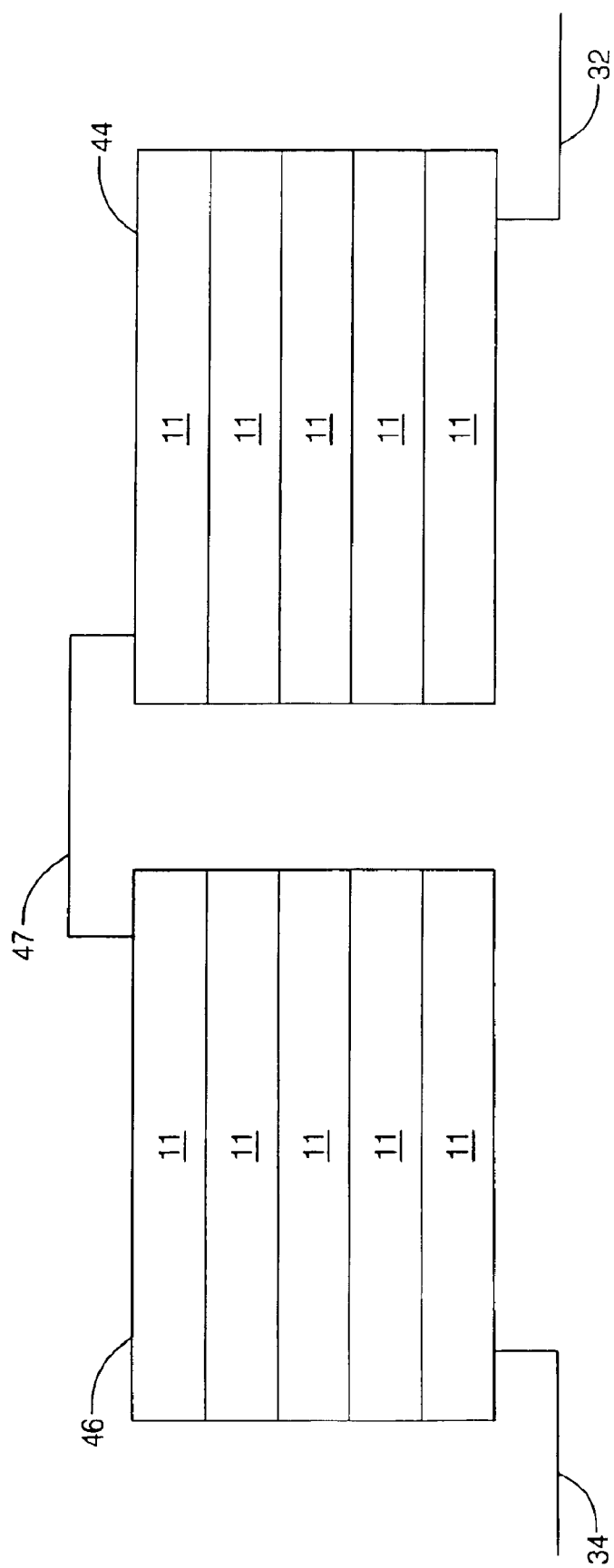
FIG. 2 is a schematic elevational view of two fuel cell stacks electrically connected in series.
Figure 6:
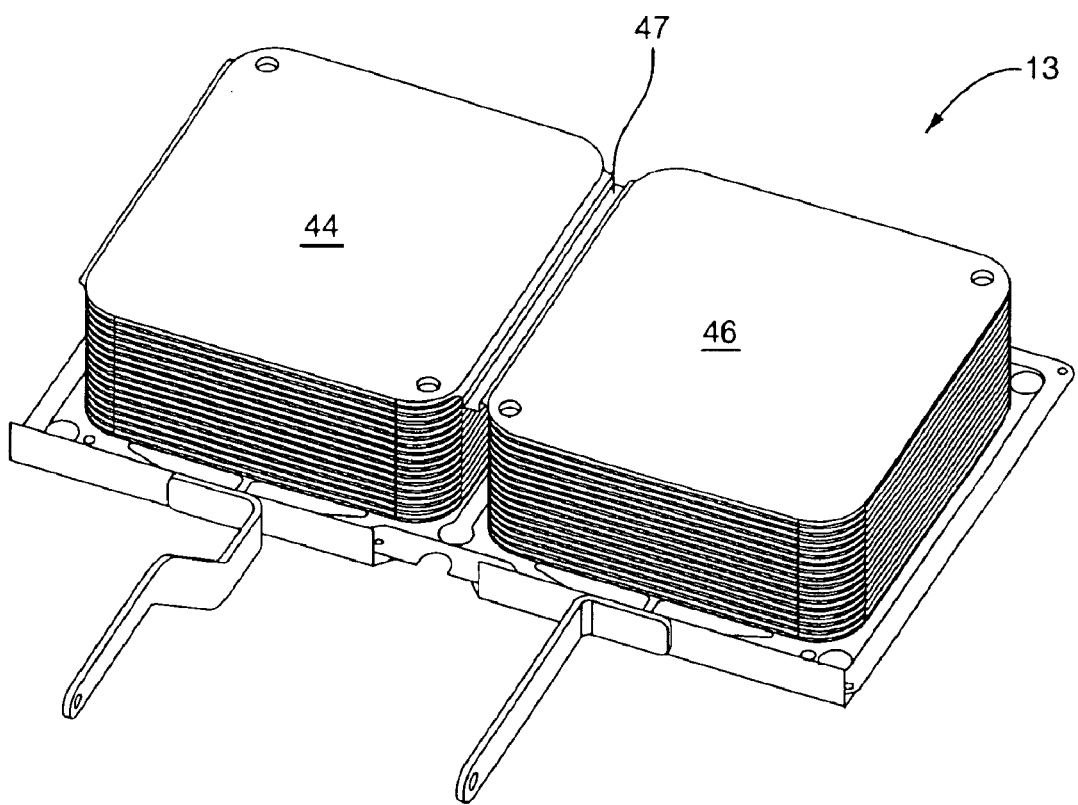
FIG. 6 is an isometric view of the two fuel cell stacks shown in FIG. 2.

Referring to FIGS. 2 and 6, the cells 11 are arranged side-by-side rather than in overlapping arrangement as shown in FIG. 1. Further, the side-by-side arrangement may comprise a plurality of cells 11, respectively, such that each of first stack 44 and second stack 46 shown in FIG. 2 is a stack of identical fuel cells 11. The cells 11 in stack 44 and stack 46 are connected electrically in series by interconnect 47, and the stacks are connected in series.

Figure 3:
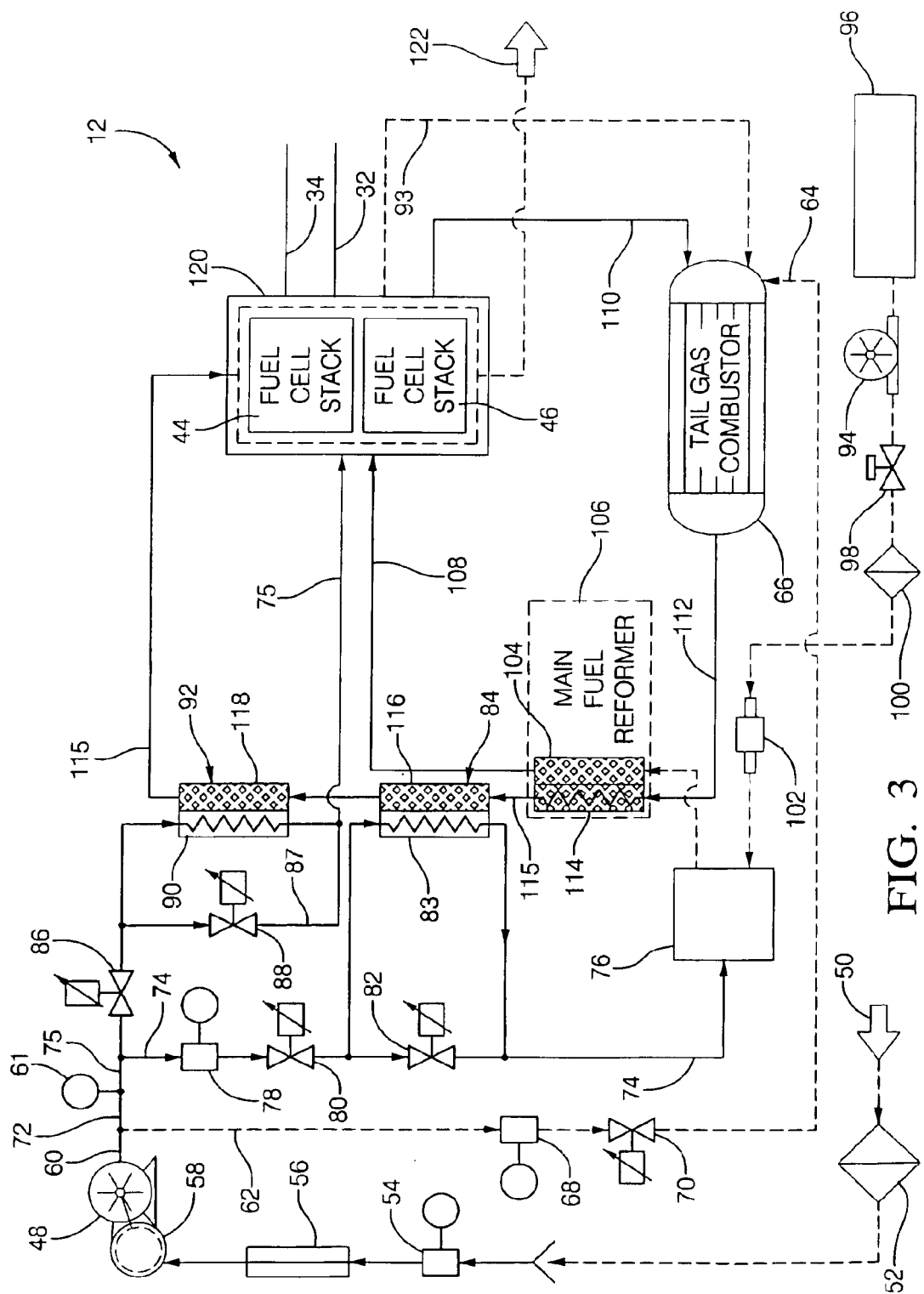
FIG. 3 is a schematic mechanization diagram of a typical SOFC assembly.

Referring to FIG. 3, the diagram of a solid-oxide fuel cell assembly 12 includes auxiliary equipment and controls for stacks 44, 46 electrically connected as in FIG. 2.

A conventional high speed inlet air pump 48 draws inlet air 50 through an air filter 52, past a first MAF sensor 54, through a sonic silencer 56, and a cooling shroud 58 surrounding pump 48.

Air output 60 from pump 48, at a pressure sensed by pressure sensor 61, is first split into branched conduits between a feed 62 and a feed 72. Feed 62 goes as burner cooling air 64 to a stack afterburner 66 via a second MAF sensor 68 and a burner cool air control valve 70.

Feed 72 is further split into branched conduits between an anode air feed 74 and a cathode air feed 75. Anode feed 74 goes to a hydrocarbon fuel vaporizer 76 via a third MAF sensor 78 and reformer air control valve 80. A portion of anode air feed 74 may be controllably diverted by control valve 82 through the cool side 83 of reformate pre-heat heat exchanger 84, then recombined with the non-tempered portion such that feed 74 is tempered to a desired temperature on its way to vaporizer 76.

Cathode air feed 75 is controlled by cathode air control valve 86 and may be controllably diverted by cathode air preheat bypass valve 88 through the cool side 90 of cathode air pre-heat heat exchanger 92 on its way to stacks 44, 46. After passing through the cathode sides of the cells in stacks 44, 46, the partially spent, heated air 93 is fed to burner 66.

A hydrocarbon fuel feed pump 94 draws fuel from a storage tank 96 and delivers the fuel via a pressure regulator 98 and filter 100 to a fuel injector 102 which injects the fuel into vaporizer 76. The injected fuel is combined with air feed 74, vaporized, and fed to a reformer catalyst 104 in main fuel reformer 106 which reforms the fuel to, principally, hydrogen and carbon monoxide. Reformate 108 from catalyst 104 is fed directly to the anodes in stacks 44, 46 at a temperature of between 800° C. and 1000° C. Unconsumed fuel 110 from the anodes is fed to afterburner 66 where it is combined with air supplies 64 and 93 and is burned. The hot burner gases 112 are passed through a cleanup catalyst 114 in main reformer 106. The effluent 115 from catalyst 114 is passed through the hot sides 116, 118 of heat exchangers 84, 92, respectively, to heat the incoming cathode and anode air. The partially-cooled effluent 115 is fed to a manifold 120 surrounding stacks 44, 46 from whence it is eventually exhausted 122.

Figure 4:
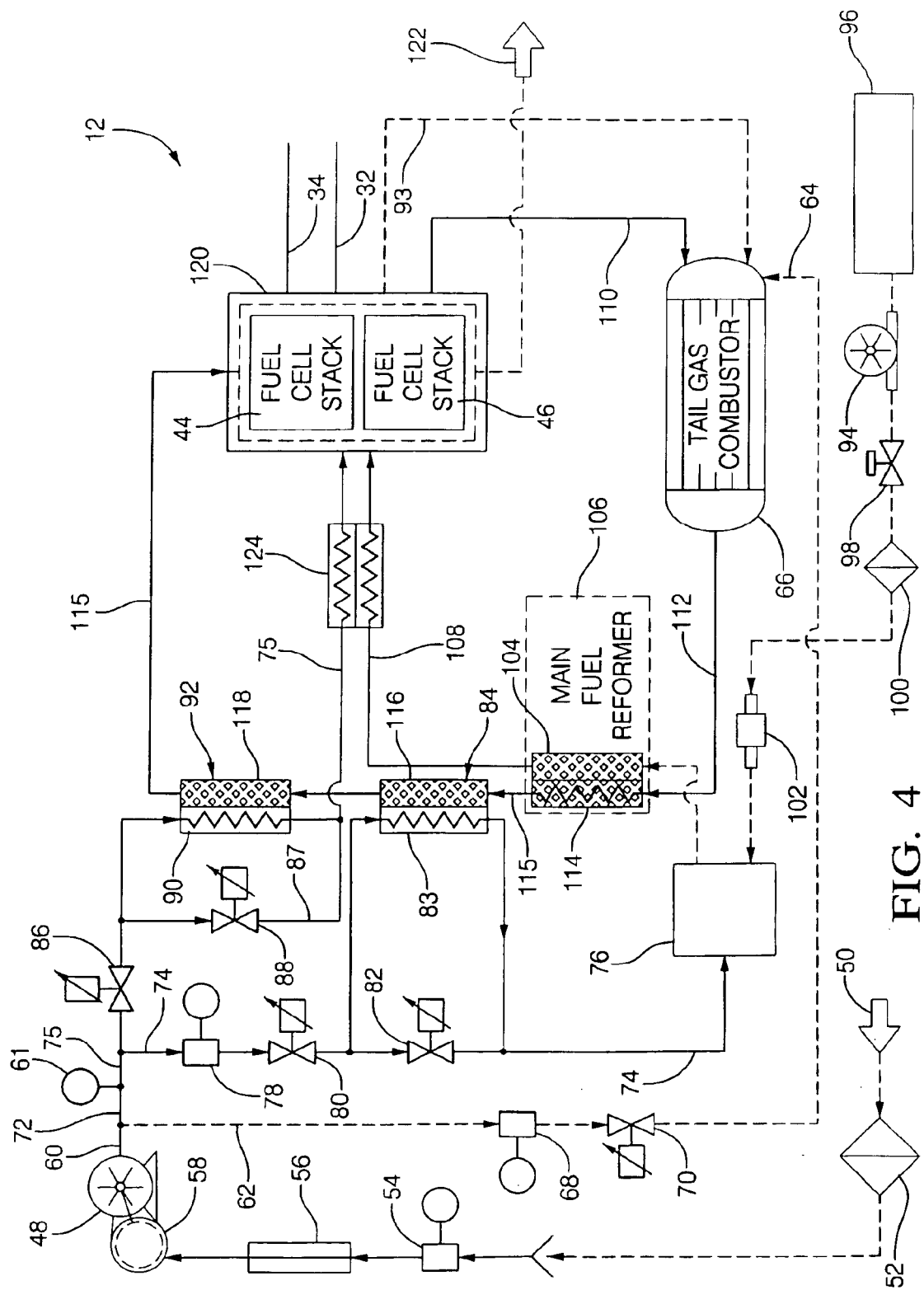
FIG. 4 is a diagram like FIG. 3, showing addition of an anode/cathode gas supply heat exchanger ahead of the fuel cell stacks.

Referring to FIG. 4, improved fuel cell assembly 13 includes a co-flow heat exchanger 124 for exchanging heat between reformate 108 and cathode air 75 flowing through the exchanger in the same direction. Reformate 108 enters exchanger 124 at substantially the reformer temperature, as described above. A portion of cathode air 75 may have been passed through heat exchanger 92, so the entering temperature of cathode air 75 may be varied by varying the position of control valve 88. Such variation can be used to control the degree of heat exchange occurring within exchanger 124 between streams 75 and 108, such that the two streams emerge and enter stacks 44, 46 desirably at about the same temperature.

Figure 5:
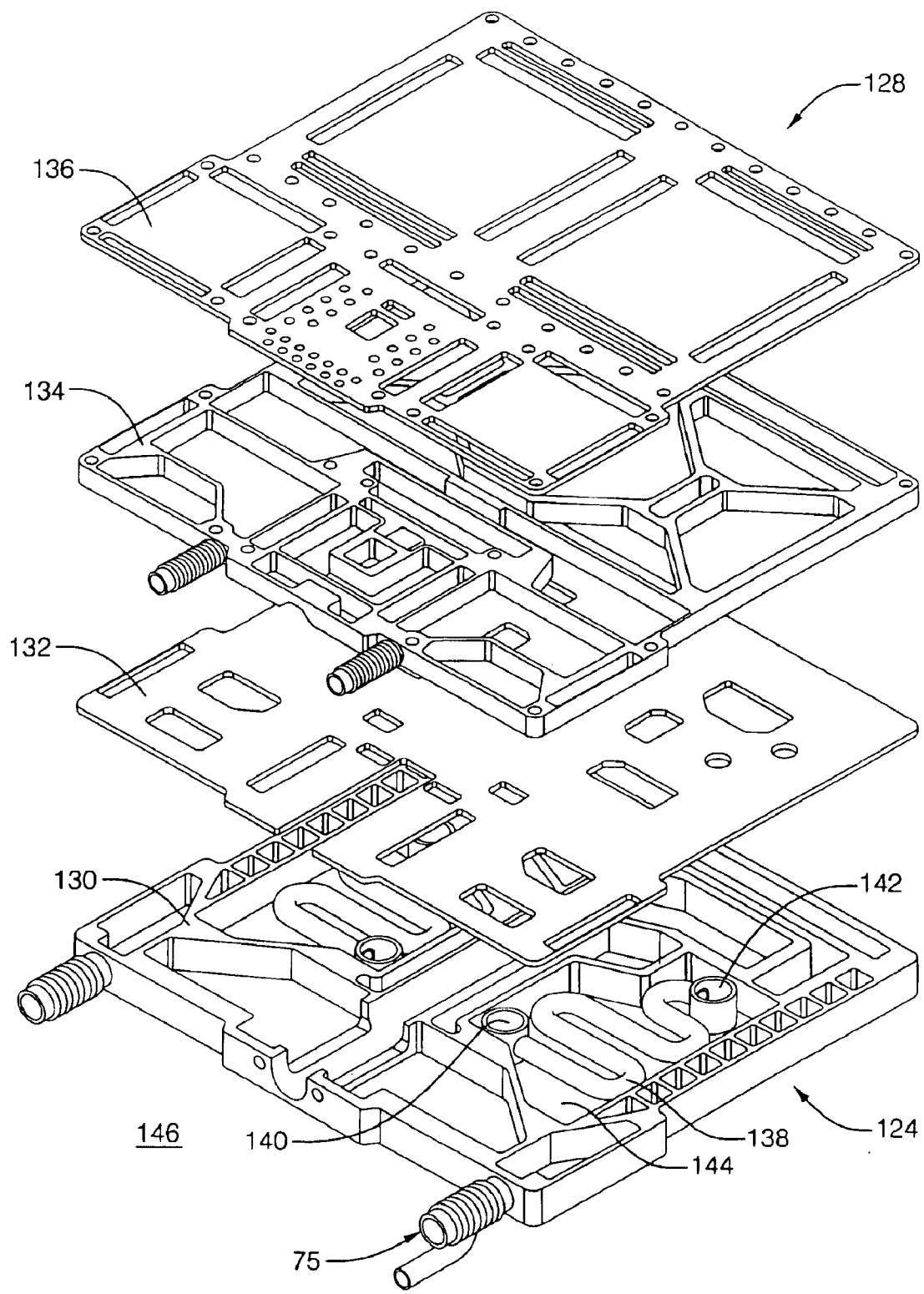
FIG. 5 is an exploded isometric view of an integrated component manifold for a solid-oxide fuel cell assembly wherein the subject heat exchanger is incorporated into the manifold.

Referring to FIG. 5, a multiple-component integrated flow distribution manifold 128 for a solid-oxide fuel cell assembly, shown in an exploded isometric view, includes a lower distribution plate 130, a first plate cover 132, an upper distribution plate 134, and a second plate cover 136. Formed integrally with lower plate 130 is heat exchanger 124, comprising a sinusoidal tube 138 having an entrance 140 and an exit 142 for conveying reformate 108 through a chamber 144 through which cathode air 75 is passed on its way to the fuel cell stacks. Tube 138 may be provided in known fashion with fins or other heat transfer enhancing means (not shown) for increasing the efficiency of exchanger 124 as desired.

An SOFC assembly in accordance with the invention is especially useful as an auxiliary power unit (APU) for vehicles 146 on which the APU may be mounted as shown in FIG. 4, such as cars and trucks, boats and ships, and airplanes, wherein motive power is supplied by a conventional engine and the auxiliary electrical power needs are met by the SOFC assembly.

An SOFC assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell assembly including a fuel cell, the fuel cell including fuel cell anodes and fuel cell cathodes, said fuel cell assembly comprising:
   a) a first flow path for reformate gas leading from a hydrocarbon reformer to fuel cell anodes, the reformate gas being at a first temperature;
   b) a second flow path for cathode air leading from a pressurizing source to fuel cell cathodes, the air being at a second temperature;
   c) an integrated flow distribution manifold; and
   d) a heat exchanger having opposite sides disposed in said first and second flow paths for allowing heat exchange between said reformate gas and said cathode air such that the temperature of said reformate gas is lowered and the temperature of said cathode air is raised, wherein said heat exchanger is formed in said integrated flow distribution manifold.

2. A fuel cell assembly in accordance with claim 1 wherein said assembly is mounted on a vehicle.

3. A fuel cell assembly in accordance with claim 2 wherein said vehicle is selected from the group consisting of car, truck, boat, and airplane.

4. A fuel cell assembly in accordance with claim 3 wherein said assembly is an auxiliary power unit for said vehicle.

5. A fuel cell assembly in accordance with claim 1 wherein said fuel cell is a solid-oxide fuel cell.

6. An automotive vehicle, comprising a fuel cell assembly for generating auxiliary power for said vehicle, the fuel cell assembly including a fuel cell, the fuel cell including fuel cell anodes and fuel cell cathodes, the asembly including
   a first flow path for reformate gas leading from a hydrocarbon reformer to fuel cell anodes, the reformate gas being at a first temperature,
   a second flow path for cathode air leading from a pressurizing source to fuel cell cathodes, the air being at a second temperature,
   an intergrated flow distribution manifold, and
   a heat exchanger having opposite sides disposed in said first and second flow paths for allowing heat exchange between said reformate gas and said cathode air such that the temperature of said reformate gas is lowered and the temperature of said cathode air is raised, wherein said heat exchanger is formed in said intergrated flow distribution manifold.

7. A method for tempering cathode air in a first flow path between a pressurizing source and a fuel cell stack and reformate gas in a second flow path between a hydrocarbon reformer and a fuel cell stack, comprising the steps of:
   a) providing a heat exchanger formed in an intergated flow distribution manifold;
   b) disposing a heat exchanger having first and second sides in said first and second flow paths, respectively; and
   c) passing heat across said heat exchanger from said reformate gas to said cathode air.

8. A method in accordance with claim 7 further comprising the step of adjusting the temperature of said cathode air before entry into said heat exchanger.

* * * * *